(12) United States Patent
    Crook (10) Patent No.: US 10,562,364 B2
(45) Date of Patent: Feb. 18, 2020

(54) VEHICLE WHEEL POSITIONING AND STEERING APPARATUS

(71) Applicant: Gary Crook, Fresno, CA (US)

(72) Inventor: Gary Crook, Fresno, CA (US)

(73) Assignee: CALIFORNIA MANUFACTURING & ENGINEERING COMPANY, LLC, Kerman, CA (US)

( * ) Notice: Subject to any disclaimer, the term of this patent is extended or adjusted under 35 U.S.C. 154(b) by 140 days.

(21) Appl. No.: 15/849,751

(22) Filed: Dec. 21, 2017

(65) Prior Publication Data

US 2019/0039430 A1  Feb. 7, 2019

Related U.S. Application Data

(60) Provisional application No. 62/540,373, filed on Aug. 2, 2017.

(51) Int. Cl.
| | | |
|---|---|---|
| B62D 57/02 | (2006.01) |
| B60G 17/015 | (2006.01) |
| B66F 11/04 | (2006.01) |
| B60B 35/10 | (2006.01) |
| B60G 3/02 | (2006.01) |

(Continued)

(52) U.S. Cl.
CPC ...... *B60G 17/0152* (2013.01); *B60B 35/1054* (2013.01); *B60G 3/02* (2013.01); *B60G 7/001* (2013.01); *B62D 5/26* (2013.01); *B62D 7/06* (2013.01); *B62D 7/16* (2013.01); *B66F 11/04* (2013.01); *B66F 11/044* (2013.01); *B60G 2200/44* (2013.01); *B60G 2202/413* (2013.01);

(Continued)

(58) Field of Classification Search
CPC .... B60B 35/1054; B66F 11/04; B66F 11/044; B66F 11/046; B62D 7/16; B62D 7/06; B62D 5/26; B60Y 2200/49; B60G 7/001; B60G 3/02; B60G 17/0152; B60G 2300/40; B60G 2200/44; B60G 2202/413
USPC .................... 180/8.1, 8.3, 8.6, 41, 209, 201; 280/124.116
See application file for complete search history.

(56) References Cited

U.S. PATENT DOCUMENTS 3,899,037 A * 8/1975 Yuker .............. B60G 17/01925
                                                    180/6.48
4,395,191 A * 7/1983 Kaiser ..................... E02F 9/085
                                                    180/7.1

(Continued)

FOREIGN PATENT DOCUMENTS

| EP | 2641860 A1 | 9/2013 |
| EP | 3023544 A1 | 5/2016 |

OTHER PUBLICATIONS

European Search Report.

*Primary Examiner* — Toan C To (57) ABSTRACT

A vehicle wheel positioning and steering apparatus particularly useful for aerial work platforms comprises a support chassis and chassis support legs pivotally connected to the chassis. Steerable wheel assemblies are operably connected at ends of the support legs and powered actuators are operably connected to the chassis and legs for pivotally moving the legs and wheel assemblies relative to the chassis between transport and working positions. Variable length linear wheel steering actuators comprise one link of four bar parallelogram steering linkages between the chassis and wheel assemblies and the support legs each comprise second bars of the four bar parallelogram steering linkages.

14 Claims, 7 Drawing Sheets

(51) Int. Cl.
  *B60G 7/00*   (2006.01)
  *B62D 5/26*   (2006.01)
  *B62D 7/06*   (2006.01)
  *B62D 7/16*   (2006.01)
(52) U.S. Cl.
  CPC ....... *B60G 2300/40* (2013.01); *B60Y 2200/49* (2013.01); *B66F 11/046* (2013.01)

(56) References Cited

U.S. PATENT DOCUMENTS

| | | | | |
|---|---|---|---|---|
| 4,482,287 A | * | 11/1984 | Menzi | E02F 9/085 180/211 |
| 4,558,758 A | * | 12/1985 | Littman | B62D 7/026 180/236 |
| 4,779,691 A | * | 10/1988 | Werdner | B62D 57/00 180/8.1 |
| 5,137,101 A | * | 8/1992 | Schaeff | B62D 57/00 180/8.1 |
| 6,119,882 A | | 9/2000 | Crook et al. | |
| 6,293,579 B1 | * | 9/2001 | Schaeff | B60G 9/04 180/209 |
| 6,443,687 B1 | | 9/2002 | Kaiser | |
| 6,564,955 B2 | * | 5/2003 | Franzen | B66C 9/12 180/23 |
| 6,827,176 B2 | | 12/2004 | Bean et al. | |
| 7,198,278 B2 | | 4/2007 | Donaldson | |
| 7,425,004 B2 | | 9/2008 | Donaldson | |
| 7,832,741 B2 | | 11/2010 | Donaldson | |
| 8,888,122 B2 | | 11/2014 | Berry | |
| 9,174,488 B2 | | 11/2015 | Berry et al. | |
| 9,387,881 B2 | * | 7/2016 | Smith | B62D 7/16 |
| 9,434,412 B2 | * | 9/2016 | Clark | B62D 7/1509 |
| 9,499,348 B2 | * | 11/2016 | Teichrob | B65G 37/00 |
| 2004/0129491 A1 | | 7/2004 | Bean et al. | |

* cited by examiner

VEHICLE WHEEL POSITIONING AND STEERING APPARATUS

CROSS REFERENCE TO RELATED APPLICATIONS

This application claims the benefit and priority of Provisional Application Ser. No. 62/540,373 filed Aug. 2, 2017.

BACKGROUND OF THE INVENTION

This disclosure pertains to wheel extension and steering apparatus, particularly useful for aerial work platform machines such as articulated and telescopic boom lifts which raise a work platform to desired elevation. The apparatus comprises a chassis and chassis support legs pivotally connected to the chassis to position steerable wheels at the ends of the chassis support legs whereby the wheels may be moved between transport positions close to the chassis and working positions at greater distance from the chassis to provide vehicle stability. In apparatus of this type, linear actuators, usually hydraulic, for steering the wheels are aligned generally transverse to the longitudinal axis of the vehicle since they must overcome considerable moment resistance as the extremes of steering angle are approached. Orientation of the linear actuators transversely to the longitudinal axis of the vehicle necessarily exposes the full length of the steering actuators to damage during movement of the vehicle.

SUMMARY

Disclosed herein is a vehicle wheel positioning and steering apparatus comprising a support chassis, chassis support legs pivotally connected to the chassis, steerable wheel assemblies operably connected at outer ends of the support legs, powered actuators operably connected to the chassis and legs for pivotally moving the legs and wheel assemblies relative to the chassis between transport and working positions and powered linear wheel steering actuators, the steering linear actuators comprising first bars of four bar parallelogram steering linkages between the chassis and wheel assemblies and the support legs comprising second bars of the four bar parallelogram steering linkages.

The vehicle wheel position and steering apparatus of the preceding paragraph is particularly useful in a mobile aerial work platform apparatus which includes a work platform mounted on the chassis and means such as an articulated boom or a telescopic boom for raising and lowering the aerial work platform relative to the chassis.

DETAILED DESCRIPTION OF PRESENTLY PREFERRED EMBODIMENT

Figure 1:
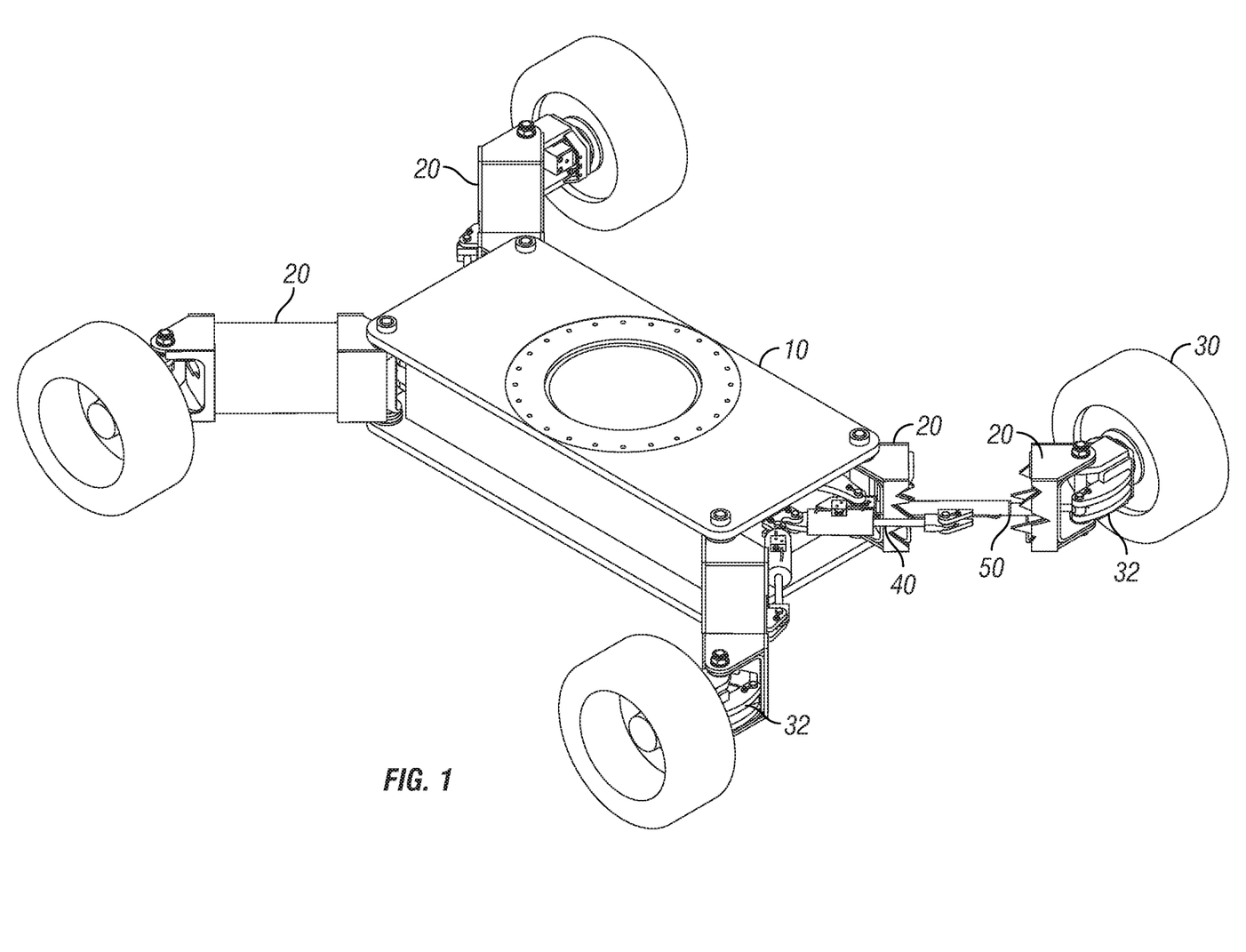
FIG. 1 is a perspective view of a support chassis for an aerial work platform apparatus.

As seen in FIG. 1 rigid chassis 10 for supporting an aerial work platform apparatus such as an extendable boom lift for elevating and lowering a work platform. Four chassis support legs 20 are pivotally connected to the chassis.

Wheel Deployment

Wheel assemblies 30 affixed at the outer ends of the support legs are laterally positioned relative to the chassis 10 as desired by linear actuators such that each of the wheel assemblies can be moved between a position close to the chassis 10 for transporting the apparatus on a trailer and a more stable working position in which the wheel assemblies are spaced further from the chassis.

Figure 2:
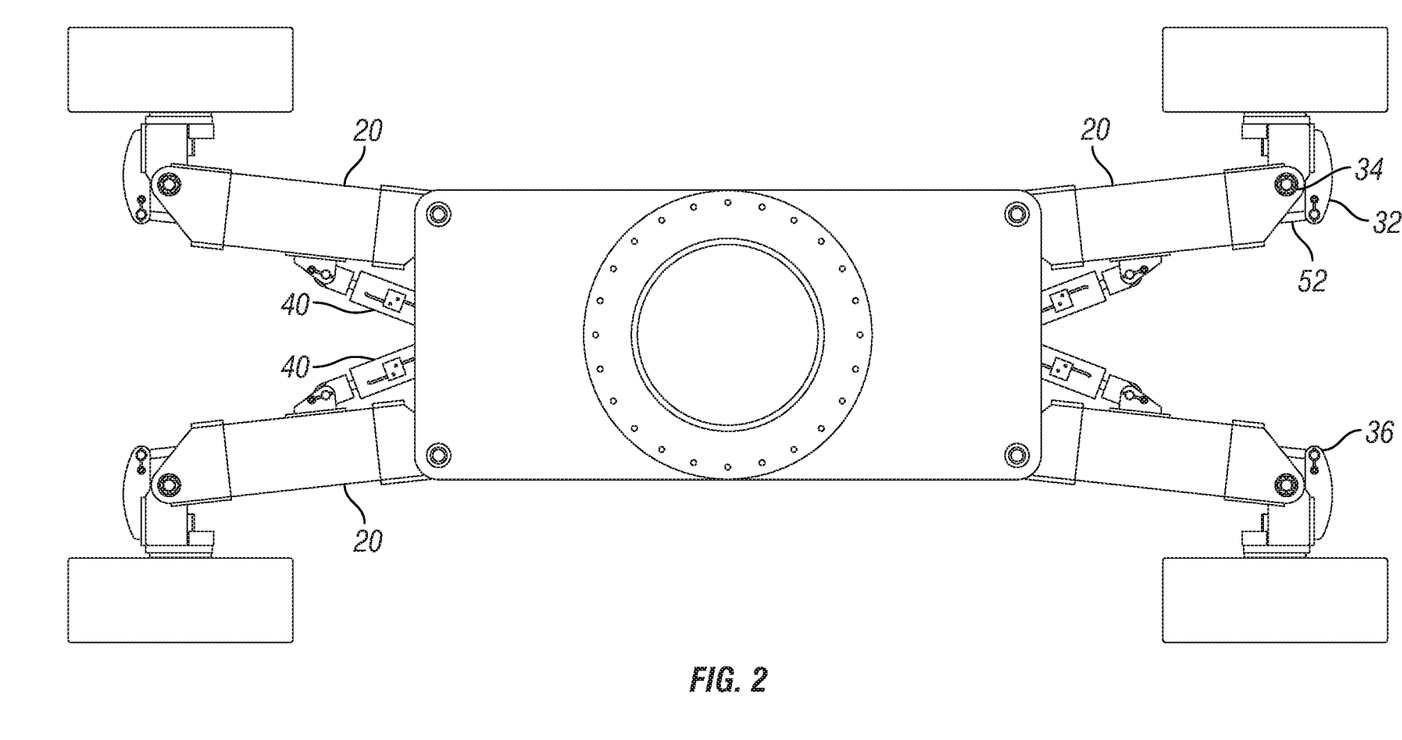
FIG. 2 is a plan view of the chassis with the wheels in straight ahead steering position and the chassis support legs in a retracted transport position.
Figure 3:
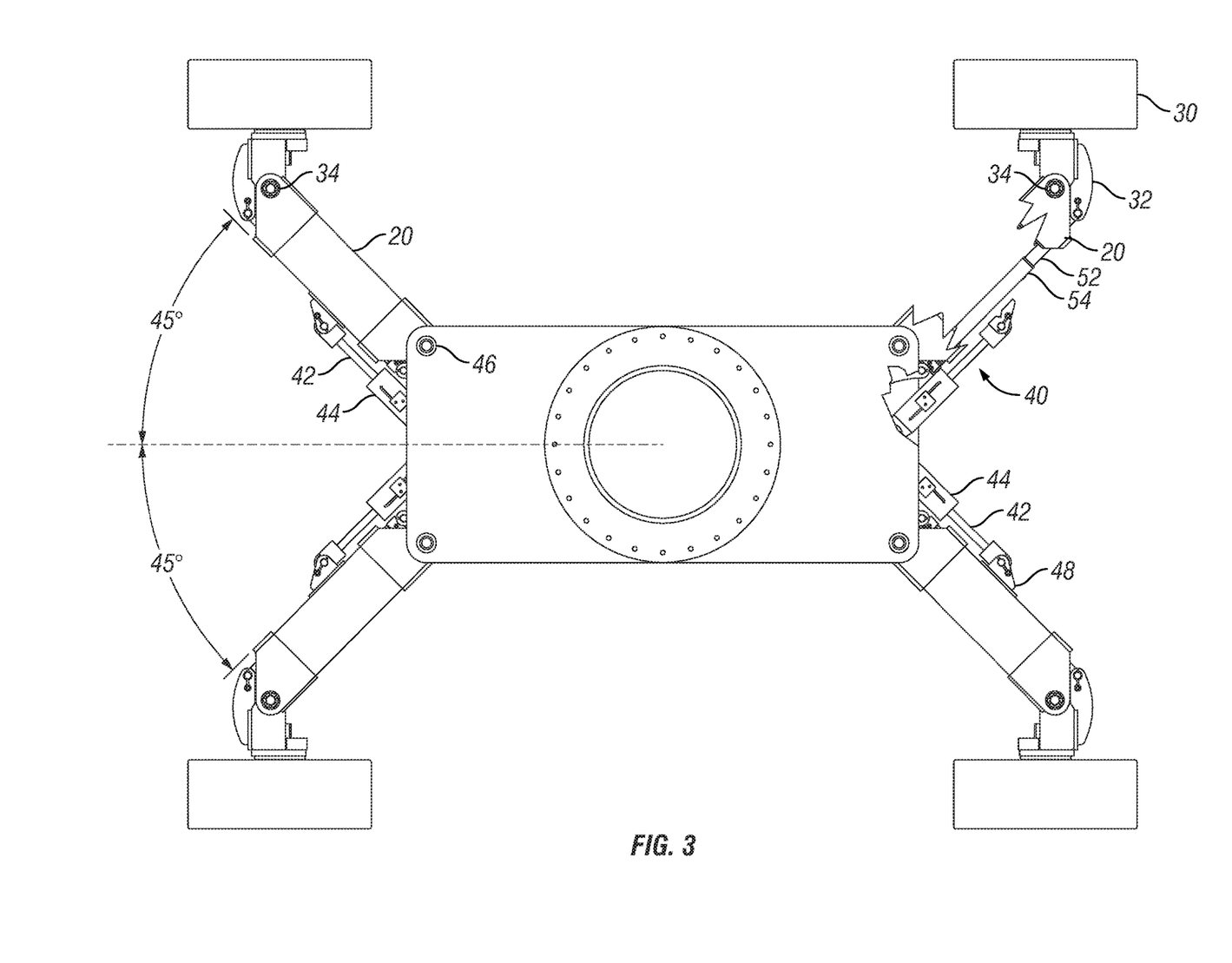
FIG. 3 is a plan view of the chassis showing the wheels in a straight ahead steering position and the chassis support legs in an extended working position.

FIGS. 2 and 3 show the angular range of movement of the chassis support legs 20 and of the wheel assemblies 30. Support leg deployment actuators 40 preferably comprise hydraulic piston/cylinder units 40 having cylinder ends 44 pivotally connected to the chassis by pins 46 supported in end brackets 47 welded to the body of the chassis. Piston ends 42 of the deployment actuators are pivotally connected to the support legs 20 at 48. In the presently preferred design, the chassis support legs 20 pivot relative to the chassis over a range of angles from less than 15° (transport position) to the chassis longitudinal centerline to a working width of about 45° to the chassis centerline to attain a transport width across the tires of about 8 ½feet and a working width of about 13 feet.

The chassis support legs 20 are preferably rectangular in cross section comprised of flat upper, lower and side plates of steel to provide interior space adequate for protective containment of the linear actuators 50 which steer the wheels. As seen in FIG. 6. in the presently preferred embodiment, the ends of the steering cylinders 54 are pivotally connected to inner end brackets 60 welded or otherwise rigidly affixed to the body of the chassis 10 and, referring to FIGS. 4 and 5, the ends of the steering pistons 52 are connected to steering pins 36 at the steering yokes 32 for positioning the steering angle of the wheels whereby the steering actuators 50 are protectively positioned in the support legs 20.

Wheel Steering

Figure 4:
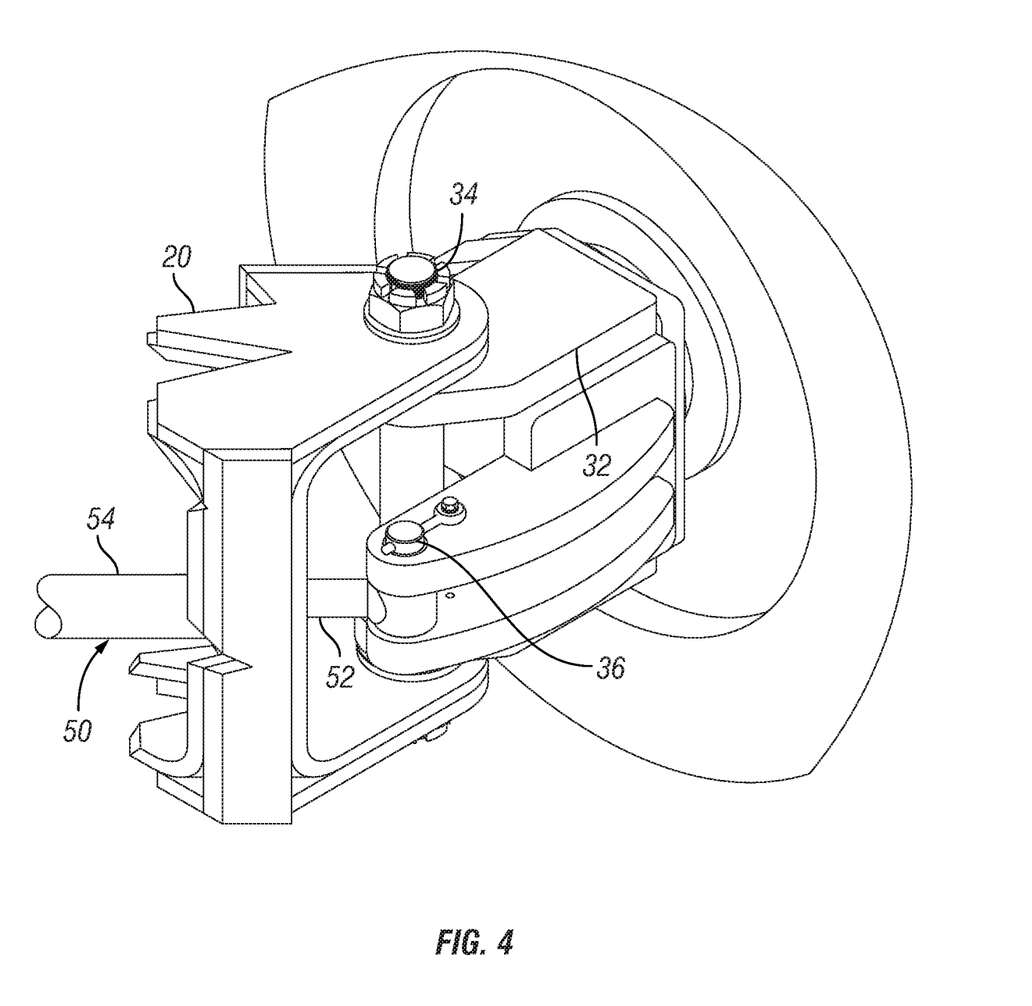
FIG. 4 is a perspective view to an enlarged scale partly broken away to show connections of a chassis support leg and wheel assembly.

In FIG. 1, one chassis support leg 20 is partially broken away, revealing a wheel steering linear actuator 50 positioned in a new and beneficial protected location interiorly of the support leg 20. Each steerable wheel assembly 30 includes a wheel and a steering yoke 32. As shown in FIG. 4, an end of the piston 52 of the associated linear wheel steering actuator 50 is pivotally connected to the yoke 32. Preferably, all four wheel assemblies are steerable.

Figure 5:
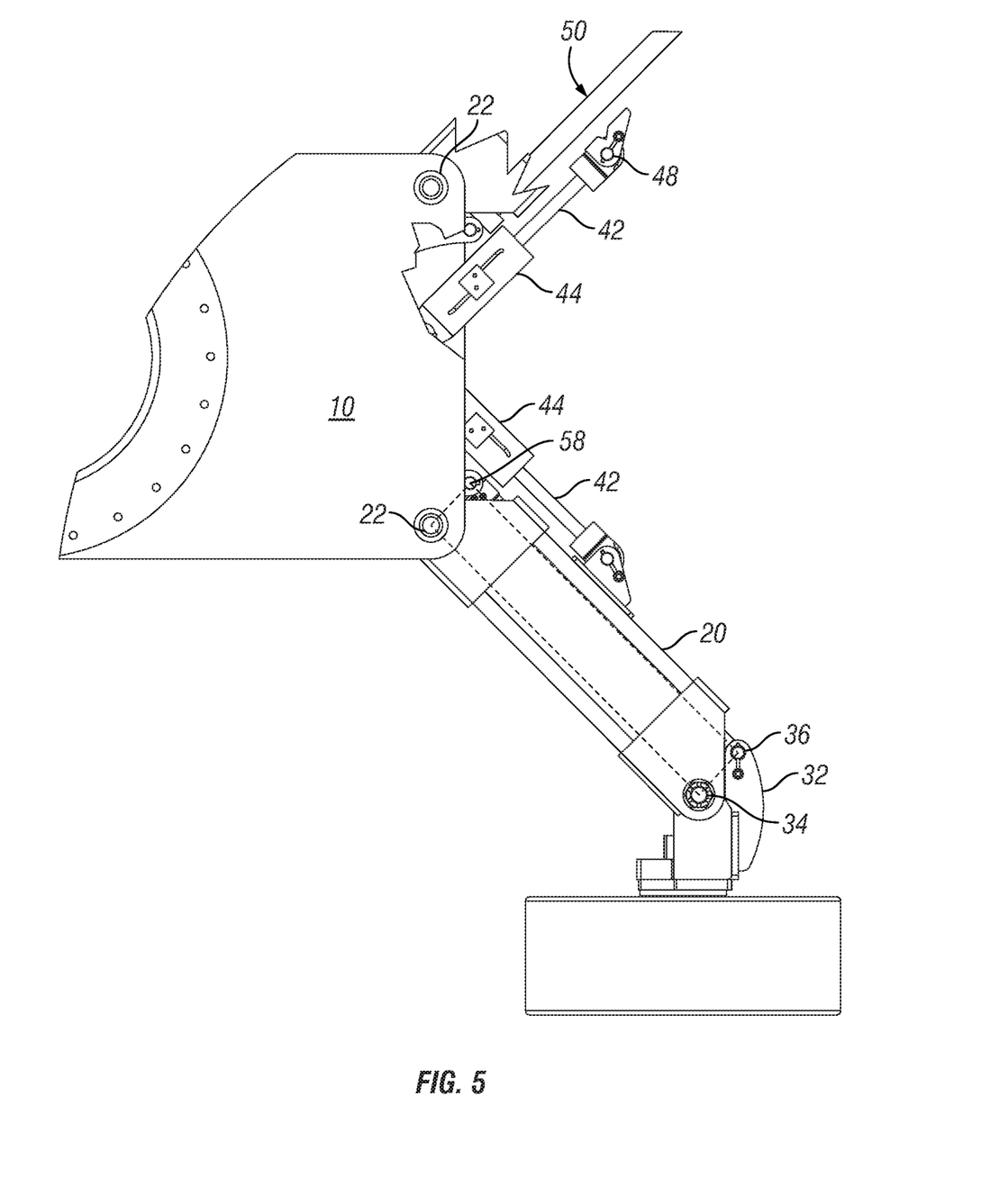
FIG. 5 is a partial plan view with dashed lines indicating parallelogram steering linkage.
Figure 6:
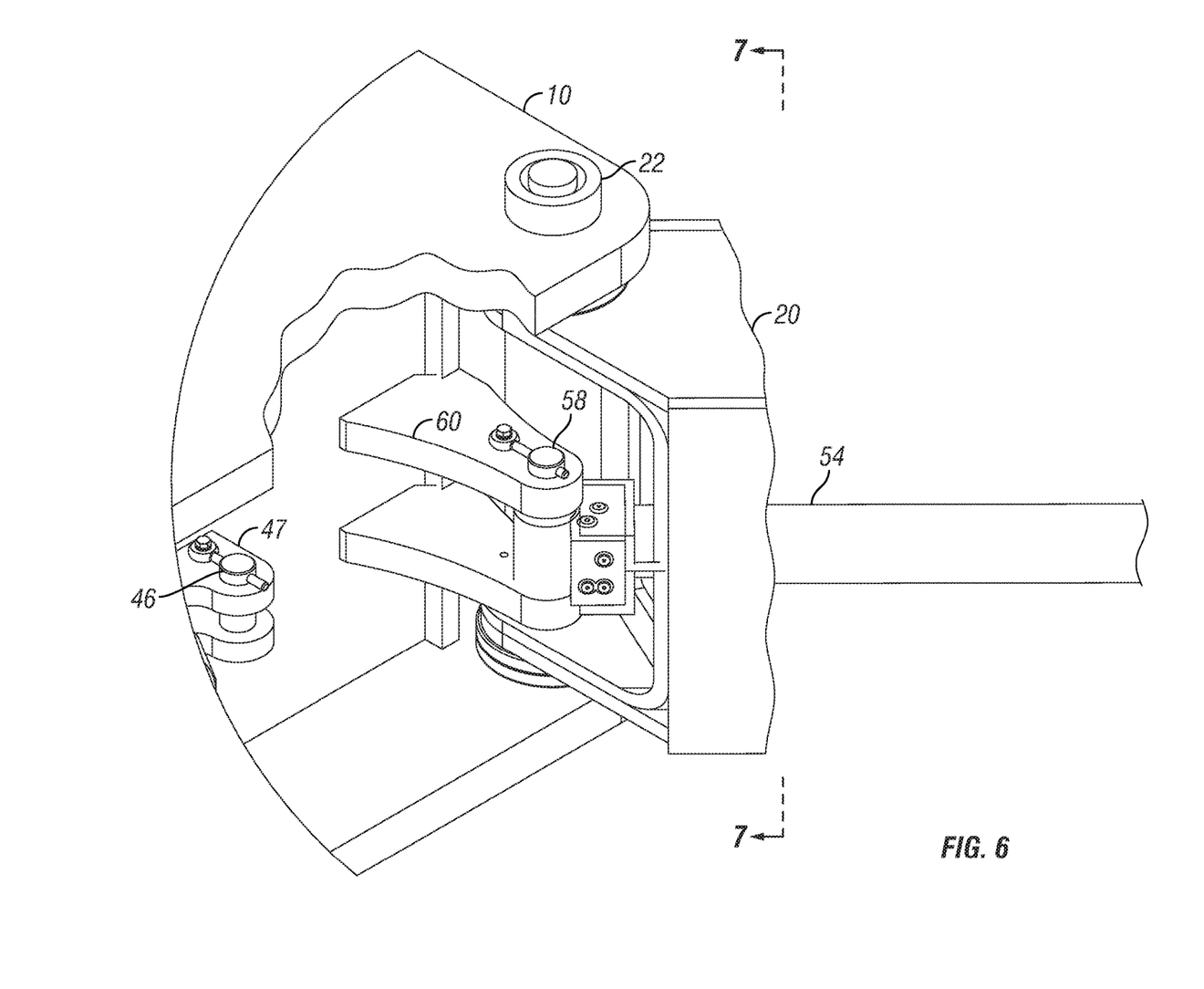
FIG. 6 is an enlarged perspective, partly broken away, of the inner end connections of one of the support legs and interiorly positioned linear steering actuators to the chassis.
Figure 7:
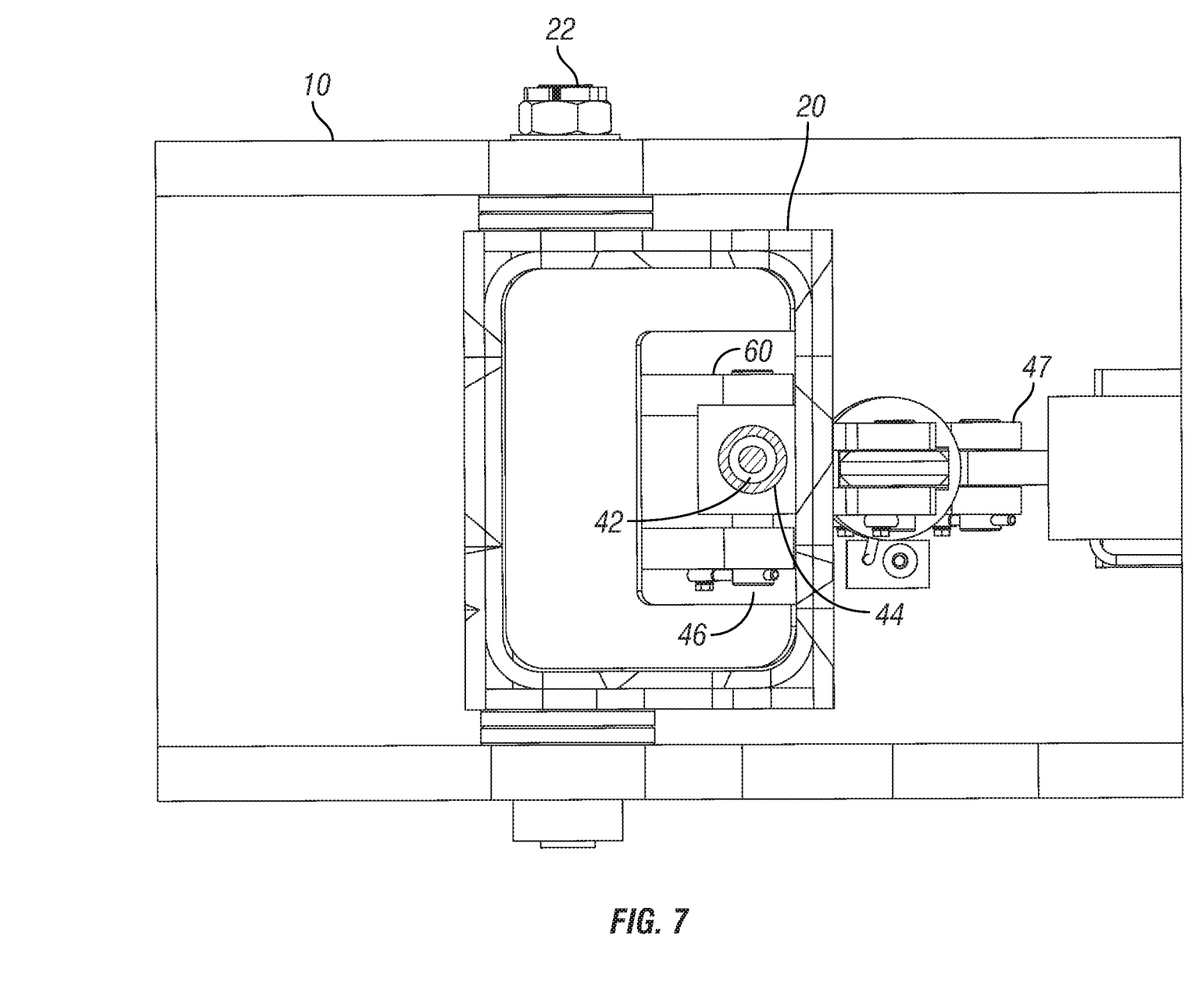
FIG. 7 is a cross sectional elevation view taken at lines 7-7 of FIG. 6.

Pivotal connections of the chassis support legs 20 with the wheel assemblies 30 and pivotal connections of the wheel steering linear actuators 50 are shown in FIGS. 4 and 5. A parallelogram linkage seen in dashed lines in FIG. 5, is provided by: (a) the fixed length chassis support legs 20 between 22 and 34 (b) the straight ahead steering length between 36 and 58 of the steering linear actuators 50; (c) the fixed length of the steering yokes 32 between the kingpins 34 and the steering pins 36; and (d) the fixed length between the pivotal connections of the support legs 20 to the chassis and the pivotal connections of the steering actuators 50 to the inner end brackets 60. The parallelogram linkage remains in a fixed configuration to maintain a straight ahead steering direction of the wheel assemblies 30 during deployment of the chassis support legs 20 from the transport to the working, position. The steering angle of the wheels 23 may then be selected by varying the length of the linear actuators 50 once the support legs have been deployed to the working position.

Operation

Steering cylinders for aerial work platform apparatus are conventionally located close to the wheels with the hydraulic steer cylinders oriented substantially perpendicular to the major axis of the vehicle. This places the steer cylinder units in positions vulnerable to impact damage and sturdy framework must be used to protect the steering cylinder units from damage in the event of an impact.

The deployment or retraction of the chassis support legs 20 necessitates slow forward or rearward driving while simultaneously operating the leg deployment actuators 40. Safe practice and operation requires that the apparatus be driven in a straight direction. The parallelogram linkage disclosed herein is employed to prevent the wheels from changing direction as they move between transport and working locations by freezing, i.e., preventing any change in length, of the wheel steering actuator 50 in the four bar linkage. With the steering actuators 50 located inside the large hollow chassis support legs, they are not only well protected but present a significantly smaller frontal area subject to impacts. Use of the steering actuators 50 as one link of the 4-bar parallelogram linkages inherently self-maintains the steering wheels in the same straight ahead wheel direction during chassis support leg deployment and retraction.

Neither the vehicle operator nor an intervention from the machine control system is needed to adjust the wheel steering angle since the machine wheels should be in the straight ahead position prior to deployment of the wheels to the working position. The steering function can still be enabled if the operator needs to make a steering correction. Chassis support leg extension or retraction is initiated as the machine is driven forward or backward in slow speed by simultaneously supplying pressurized hydraulic fluid to each of the four support leg deployment cylinders preferably only when the machine is in motion. The support legs sequentially deploy in an order depending on the load in each cylinder such that the lightest loaded will reach full deployment first. During deployment as the vehicle slowly moves, the wheels thereby roll in a diagonal direction leaving insignificant evidence of scrubbing action on the support surface.

Persons skilled in the art will also appreciate that various additional modifications can be made in the preferred embodiment shown and described above and that the scope of protection is limited only by the wording of the claims which follow.

The invention claimed is:

1. A vehicle wheel positioning and steering apparatus comprising a support chassis, chassis support legs pivotally connected to the chassis, steerable wheel assemblies operably connected at outer ends of said support legs, powered actuators operably connected to said chassis and said legs for pivotally moving said legs and wheel assemblies relative to said chassis between transport and working positions, and powered linear wheel steering actuators comprising first bars of four bar parallelogram steering linkages between said chassis and said wheel assemblies, said support legs comprising second bars of said four bar parallelogram steering linkages, and said chassis being pivotally connected to ends of said steering actuators thereby defining third bars of said four bar parallelogram steering linkages, said steering actuators being positioned in protected locations in said support legs.

2. The apparatus of claim 1, wherein said chassis includes inner end brackets pivotally connected to said steering actuators.

3. The apparatus of claim 1 wherein said wheel assemblies each include a yoke having pivotal connections to a support leg and a steering actuator, said yokes comprising fourth bars of said four bar parallelogram steeling linkage.

4. The apparatus of claim 3, wherein said steering actuators have piston ends pivotally connected to said yokes and cylinder ends pivotally connected to said chassis.

5. The apparatus of claim 4, wherein said steering actuators comprise hydraulic piston/cylinder units.

6. The apparatus of claim 5, further including powered actuators positioning said support leg and wheel assemblies relative to said chassis, said powered actuators comprising linear actuators pivotally connected between said chassis and said support legs.

7. The apparatus of claim 6, wherein there are four of said chassis support legs and wheel assemblies.

8. A mobile aerial work platform apparatus including a support chassis, a work platform mounted on said chassis, chassis support legs pivotally connected to the chassis, steerable wheel assemblies operably connected at outer ends of said support legs, powered actuators operably connected to said chassis and said legs for pivotally moving said legs and wheel assemblies relative to said chassis between transport and working positions and powered linear wheel steering actuators comprising first bars of four bar parallelogram steering linkages between said chassis and said wheel assemblies, said support legs comprising second bars of said four bar parallelogram steering linkages, and said chassis being pivotally connected to ends of said steering actuator thereby defining third bars of said four bar parallelogram steering linkages, said steering actuators being positioned in protected locations in said support legs.

9. The apparatus of claim 8, wherein said chassis includes inner end brackets pivotally connected to said steering, actuators.

10. The apparatus of claim 8, wherein said wheel assemblies each include a yoke having pivotal connections to a support leg and a steering actuator, said yokes comprising fourth bars of said four bar parallelogram steering linkage.

11. The apparatus of claim 10, wherein said steering actuators have piston ends pivotally connected to said yokes and cylinder ends pivotally connected to said chassis.

12. The apparatus of claim 11, wherein said steering actuators comprise hydraulic piston/cylinder units.

13. The apparatus of claim 12, further in powered actuators for positioning said support legs and wheel assemblies relative to sad chassis, said powered actuators comprising linear actuators pivotally connected between said chassis and said support legs.

14. The apparatus of claim 13, wherein there are four of said chassis support legs and wheel assemblies.

\* \* \* \* \*